(12) United States Patent
Poggio et al.

(10) Patent No.: US 6,389,805 B1
(45) Date of Patent: May 21, 2002

(54) METHOD FOR THE DIAGNOSIS OF AN EXHAUST GAS PURIFICATION SYSTEM FOR AN INTERNAL COMBUSTION ENGINE

(75) Inventors: Luca Poggio, Spinetta Marengo; Ciro Barberio, Zola Predosa; Matteo De Cesare, Torremaggiore; Daniele Ceccarini, Rimini, all of (IT)

(73) Assignee: Magneti Marelli S.p.A., Milan (IT)

( * ) Notice: Subject to any disclaimer, the term of this patent is extended or adjusted under 35 U.S.C. 154(b) by 0 days.

(21) Appl. No.: 09/696,174

(22) Filed: Oct. 26, 2000

(30) Foreign Application Priority Data

Oct. 26, 1999 (IT) .......................................... BO99A0574

(51) Int. Cl.[7] ............................................... F01N 3/00
(52) U.S. Cl. ............................. 60/277; 60/274; 60/284; 60/299
(58) Field of Search ........................ 60/274, 277, 284, 60/299

(56) References Cited

U.S. PATENT DOCUMENTS

| 5,419,122 A | | 5/1995 | Tabe et al. ..................... 60/274 |
| 5,647,205 A | | 7/1997 | Wier et al. ..................... 60/274 |
| 5,706,652 A | * | 1/1998 | Sultan ........................... 60/277 |
| 5,729,971 A | * | 3/1998 | Matsuno et al. .............. 60/277 |
| 5,802,843 A | * | 9/1998 | Kurihara et al. .............. 60/277 |
| 5,854,079 A | * | 12/1998 | Kato ............................ 60/299 |
| 5,865,027 A | * | 2/1999 | Hanafusa et al. ............. 60/277 |
| 5,938,715 A | | 8/1999 | Zhang et al. ................ 701/109 |
| 6,050,087 A | * | 4/2000 | Kurihara et al. .............. 60/277 |

FOREIGN PATENT DOCUMENTS

| EP | 0 779 416 | 6/1997 |
| EP | 1 091 108 | 4/2001 |

OTHER PUBLICATIONS

XP–002139547, p. 295, line 1—p. 300, last line, figures 133–136.

* cited by examiner

*Primary Examiner*—Thomas Denion
*Assistant Examiner*—Diem Tran
(74) *Attorney, Agent, or Firm*—Jacobson Holman, PLLC

(57) ABSTRACT

A method for the diagnosis of an exhaust gas purification system for an internal combustion engine, provided with a pre-catalyst and a main catalyst disposed along an exhaust duct of an internal combustion engine; the method including the stages of determining a real heat supplied to the exhaust gases in the pre-catalyst as a function of a input temperature and an output temperature of the exhaust gases at the input and output respectively of the pre-catalyst; determining a nominal heat supplied during nominal operating conditions of the pre-catalyst; calculating an index representative of the state of wear of the pre-catalyst, as a function of the real heat and the nominal heat; comparing the index with a threshold value.

14 Claims, 7 Drawing Sheets

METHOD FOR THE DIAGNOSIS OF AN EXHAUST GAS PURIFICATION SYSTEM FOR AN INTERNAL COMBUSTION ENGINE

The present invention relates to a method for the diagnosis of an exhaust gas purification system for an internal combustion engine.

BACKGROUND OF THE INVENTION

As is known, internal combustion engines that are currently in use are provided with exhaust gas purification systems that are intended to minimise emissions of polluting substances, for instance nitrogen oxides, carbon monoxide and non-combusted hydrocarbons.

Some parts of these systems are subject to wear and it is therefore necessary, in order to ensure removal of the polluting emissions of an acceptably efficient level, that their operating condition is constantly monitored.

For greater clarity, an exhaust gas purification system of the type commonly used is shown by reference numeral 1 in FIG. 1.

The system 1 is connected to an internal combustion engine 2 and comprises a pre-catalyst 3, disposed along an exhaust duct 4 to the rear of the engine 2, and a main catalyst 5, disposed further downstream. The pre-catalyst 3 is typically a three-way catalyst or TWC.

A first oxygen sensor 6, typically a linear LAMBDA or UEGO probe, is disposed at the input of the pre-catalyst 3, while a second oxygen sensor 7, for instance a probe of LAMBDA ON/OFF type, is disposed at the output of the main catalyst 5. An output temperature sensor 8 also measures the temperature of the exhaust gases at the output of the pre-catalyst 3.

The oxygen sensors 6 and 7 generate a first and respectively a second exhaust gas composition signal $V_1$ and $V_2$, representative of titres $\lambda_I$ and $\lambda_F$ at the input and output of the pre-catalyst 3, while the temperature sensor 8 supplies an output temperature signal $V_o$ representative of the output temperature $T_o$ of the exhaust gases on output from the pre-catalyst 3. These signals are supplied as input to a control unit 10 that further receives a plurality of engine-related parameters (for instance number of revolutions RPM and load L), on the basis of which the operating point of the engine 2 can be determined. The control unit 10 performs a diagnostic algorithm and generates as output an error signal E, for instance of logic type, which assumes a first logic value when a malfunction of the system 1 is detected.

The pre-catalyst 3 and the main catalyst 5 are the most important components of the system 1 and it is therefore fundamental to ensure that their efficiency is constantly kept above a minimum threshold. It is therefore necessary to provide methods that make it possible to ascertain whether, as a result of ageing or malfunction, there has been any deterioration of their performance and whether maintenance work needs to be carried out to ensure that the system is returned to normal operation.

Methods are in particular known for the diagnosis of exhaust gas purification systems, substantially similar to the system 1 described above, based on the information supplied to the control unit 10 by the oxygen sensors 6 and 7.

These methods have some drawbacks.

In particular, the fact that the known methods make it possible to carry out only an overall diagnosis of the system, while evaluation of the performance of the individual pre-catalyst 3 is difficult and not very reliable, is a drawback.

Diagnosis of the pre-catalyst 3 is possible only during ignition transients of the engine 2, since the main catalyst 5 requires longer times to achieve maximum efficiency. Therefore, in the initial phases of operation, during which the pre-catalyst 3 and the main catalyst 5 are being brought to respective operating temperatures, the removal of the polluting emissions may be attributed completely to the action of the pre-catalyst 3 which reaches conditions of maximum efficiency more rapidly.

It is not possible, however, to determine the duration of the heating transient of the pre-catalyst 3 or the moment at which the main catalyst 5 starts to play a significant part in the removal of the polluting emissions with any certainty.

It is known, moreover, that the duration of the heating transient of the pre-catalyst 3, increases, in a manner that cannot be accurately determined, with the ageing of this pre-catalyst 3. Consequently, when the efficiency of the system 1 decreases because of wear, the traditional diagnostic methods become less reliable.

SUMMARY OF THE INVENTION

The object of the present invention is to provide a diagnostic method which is free from the drawbacks described above and is, in particular, reliable and not influenced by the ageing of the pre-catalyst.

The present invention therefore relates to a method for the diagnosis of an exhaust gas purification system in an internal combustion engine, comprising a pre-catalyst and a main catalyst disposed along an exhaust duct of an internal combustion engine, first temperature detection means disposed at the input of the pre-catalyst and generating a first temperature signal representative of an input temperature $T_I$ of the exhaust gases at the input of this pre-catalyst, second temperature detection means disposed at the output of the pre-catalyst and generating a second temperature signal representative of an output temperature $T_o$ of the exhaust gases at the output of this pre-catalyst, oxygen sensor means, disposed at the input of the pre-catalyst and generating an exhaust gas composition signal, representative of an input oxygen titre $\lambda_I$, a control unit receiving as input the first and second temperature signals and the exhaust gas composition signal and supplying as output an error signal, characterised in that it comprises the stages of:

a) determining a real heat $Q_R$ supplied to the exhaust gases within the pre-catalyst as a function of the input temperature $T_I$ and output temperature $T_o$, b) determining a nominal heat $Q_{NOM}$ corresponding to nominal operating conditions of the pre-catalyst, c) determining an index I, representative of the state of wear of the pre-catalyst, as a function of this real heat $Q_R$ and nominal heat $Q_{NOM}$.

BRIEF DESCRIPTION OF THE DRAWINGS

The present invention is described in further detail below with reference to an embodiment thereof, given purely by way of non-limiting example, with reference to the accompanying drawings, in which.

DETAILED DESCRIPTION OF THE INVENTION

Figure 1:
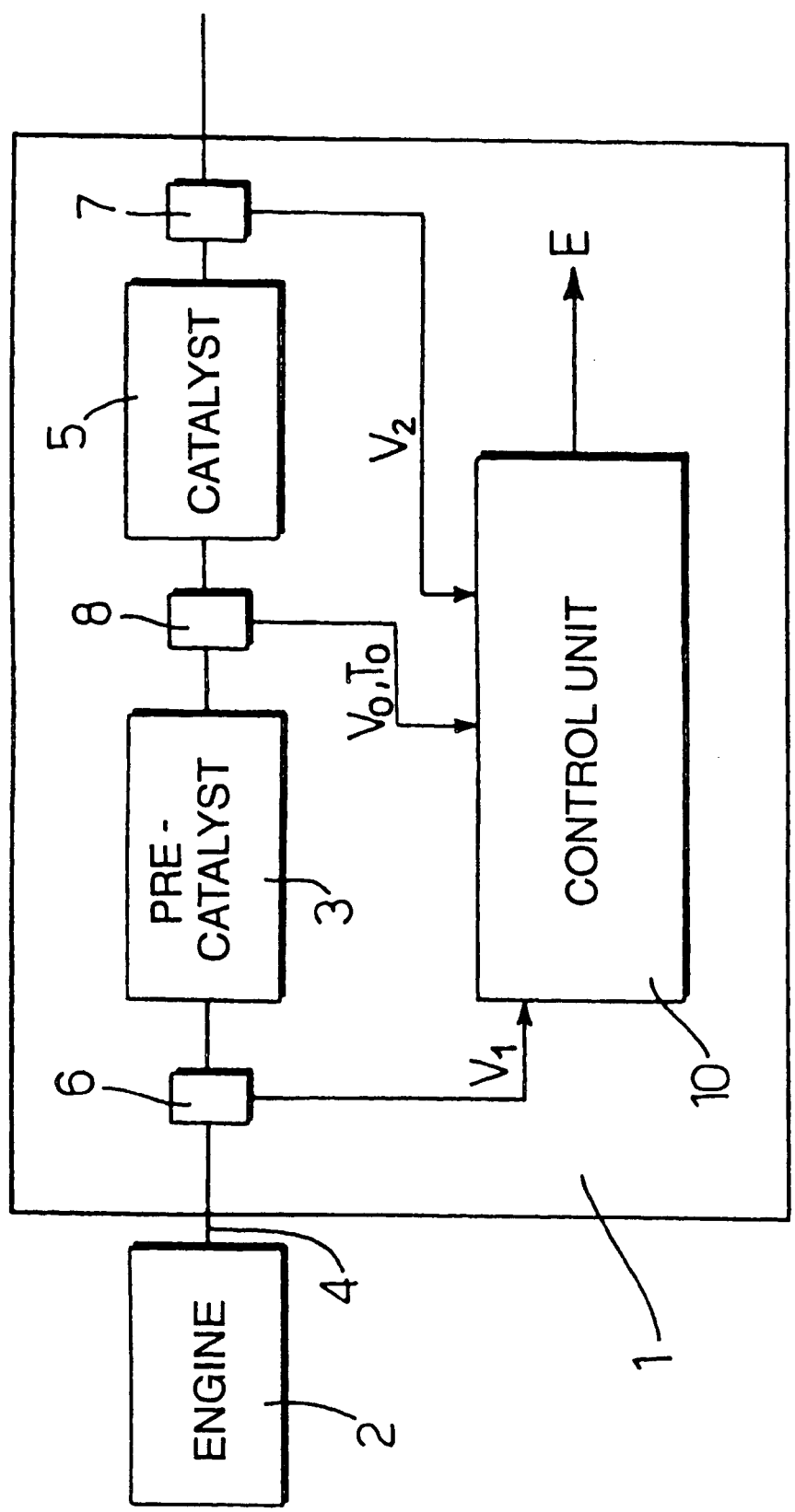
FIG. 1 is a simplified block diagram of an exhaust gas control system implementing a method of known type.
Figure 2:
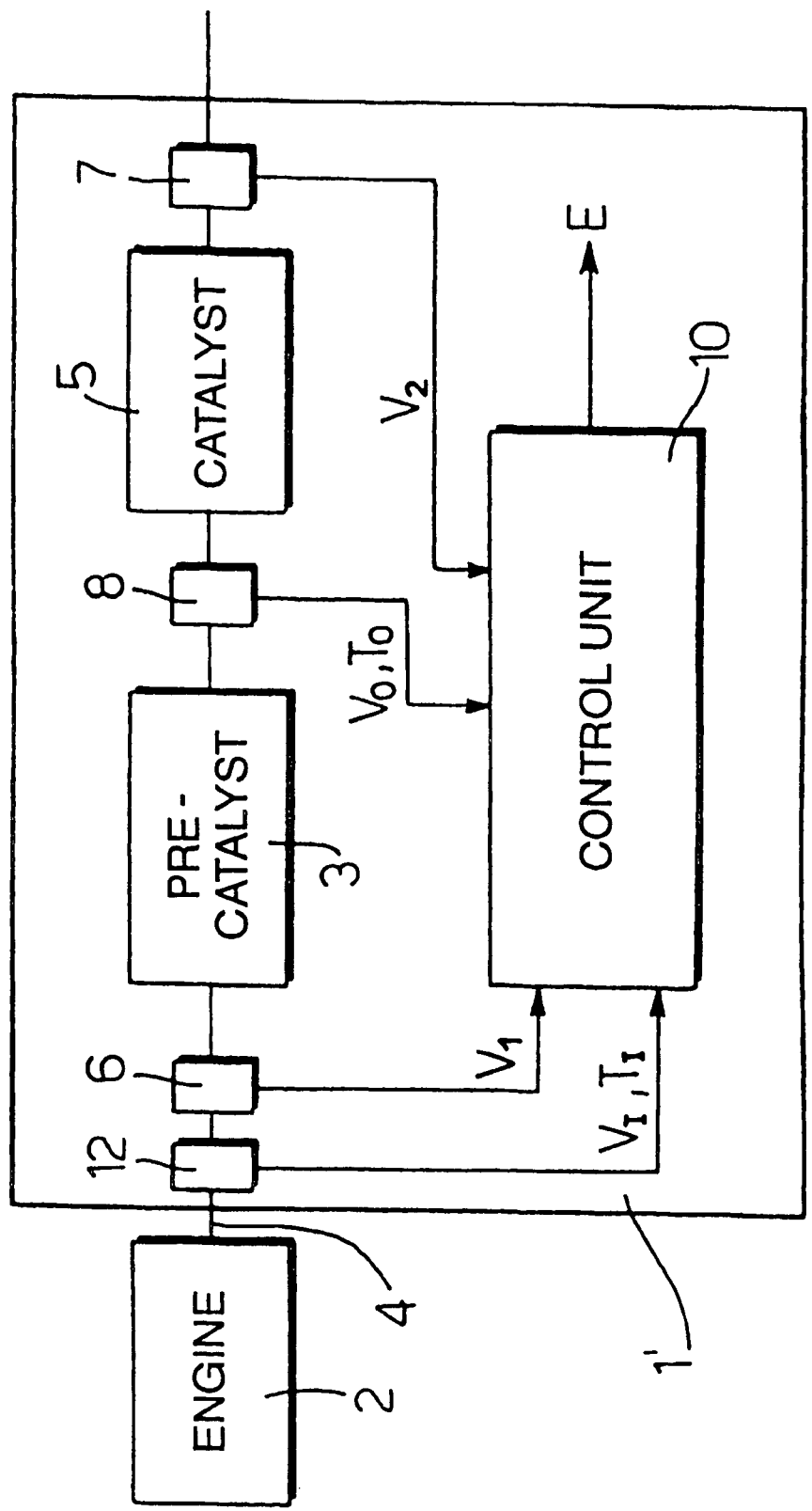
FIG. 2 is a simplified block diagram of an exhaust gas control system implementing the method of the present invention.

FIG. 2 shows an exhaust gas purification system 1' which implements the diagnostic method of the present invention. For simplicity, members identical to those already described with reference to FIG. 1 bear the same reference numerals.

In particular, the system 1' comprises the same members as the system 1 of FIG. 1 and differs in that it further comprises an input temperature sensor 12 disposed at the input of the pre-catalyst 3, which generates and supplies to the control unit 10 a signal $V_I$ representative of the input temperature $T_I$.

Figure 3:
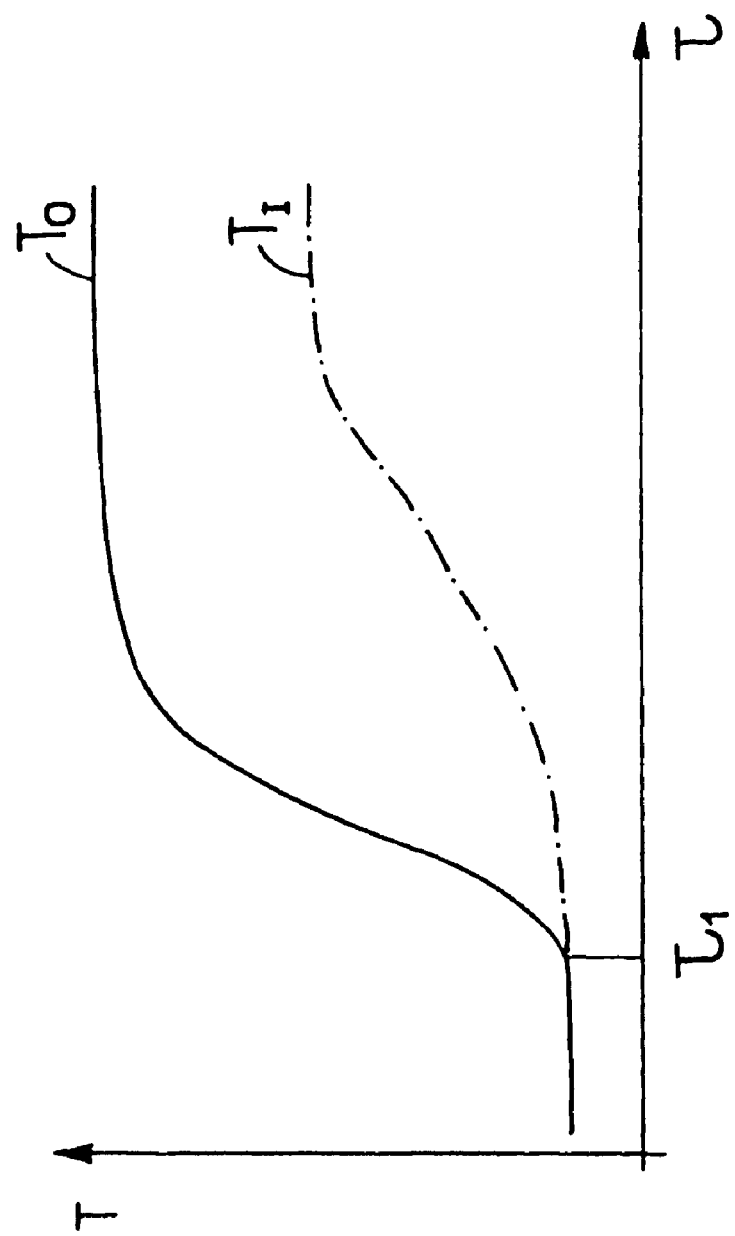
FIGS. 3 and 4 are graphs of the temperature curves of the exhaust gases during the operation of the system of FIG. 1.

When the engine 2 is started, the pre-catalyst 3 is brought to an operating temperature $T_{OP}$, for instance equal to 350° C., giving rise to highly exothermic oxidation reactions. The exhaust gases are therefore heated as they pass into the pre-catalyst 3 and, as shown in FIG. 3, from a first instant $\tau_1$, the output temperature $T_o$ (shown in FIG. 3 by a continuous line) increases with respect to the input temperature $T_I$ (dot-dashed line).

With wear, a portion of the pre-catalyst 3 becomes inert and the oxidation reactions take place at some distance from its inlet. It is therefore necessary to provide a certain quantity of heat in order to heat the inert portion of the pre-catalyst 3 before the oxidation reactions can begin at a second instant $\tau_2$, greater than $\tau_1$. The output temperature $T_o$ starts, moreover, to increase less rapidly than in the case in which the pre-catalyst 3 is new.

Figure 4:
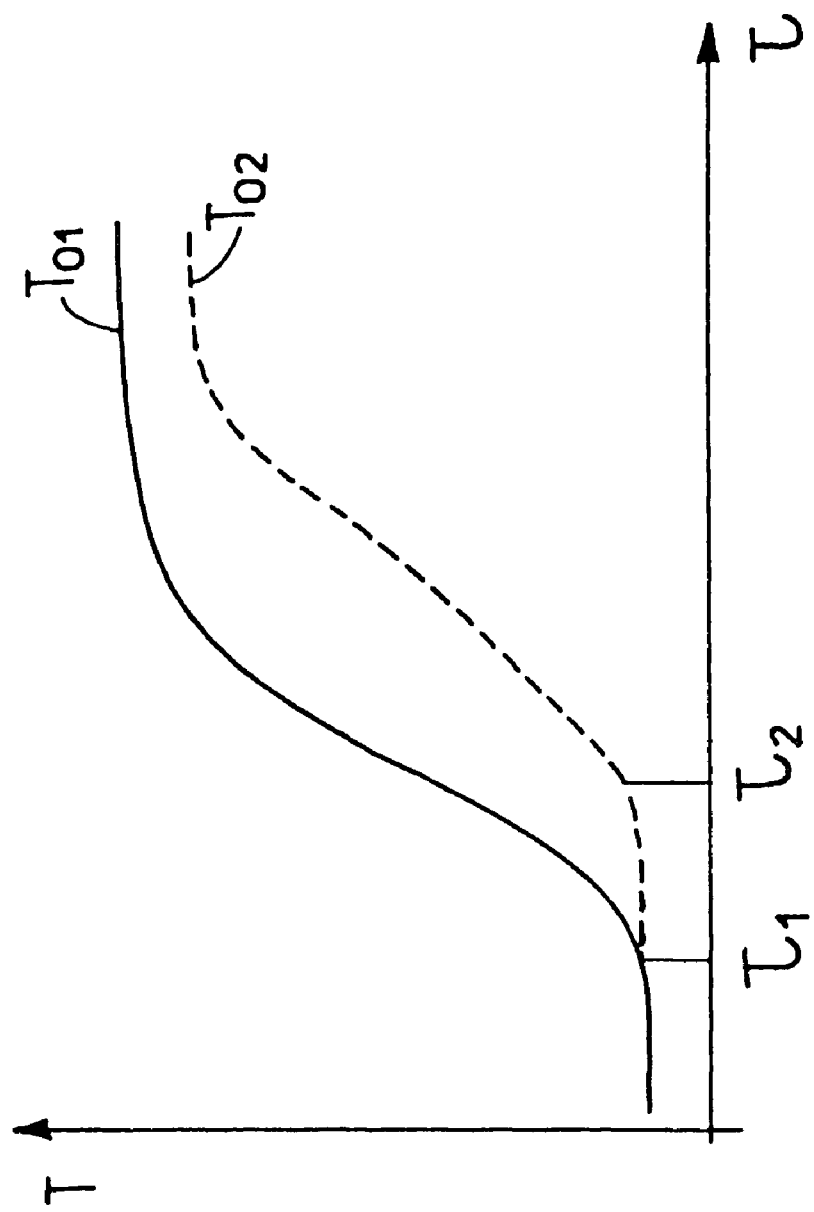

FIG. 4 shows a comparison between the curves of an output temperature $T_{O1}$ from a new pre-catalyst 3 (shown by a continuous line), i.e. operating in nominal conditions and with nominal performance, and an output temperature $\tau_{O2}$ from a worn pre-catalyst 3 (shown by a dashed line). Since the area under each curve is representative of the heat supplied to the exhaust gases in the corresponding operating conditions, it will be appreciated that the quantity of heat that the pre-catalyst 3 is able to supply decreases with the ageing of this pre-catalyst 3.

In particular, a new pre-catalyst 3 is able to supply to the exhaust gases, in a time interval $\Delta\tau$ between an initial instant $\tau_I$, lower than $\tau_1$, and a current instant $\tau_C$, a nominal heat $Q_{NOM}$ which may be calculated from the nominal power $P_{NOM}$ according to the equation:

$$Q_{NOM} = \int_{\tau_I}^{\tau_C} P_{NOM} \, d\tau \tag{1}$$

Figure 5:
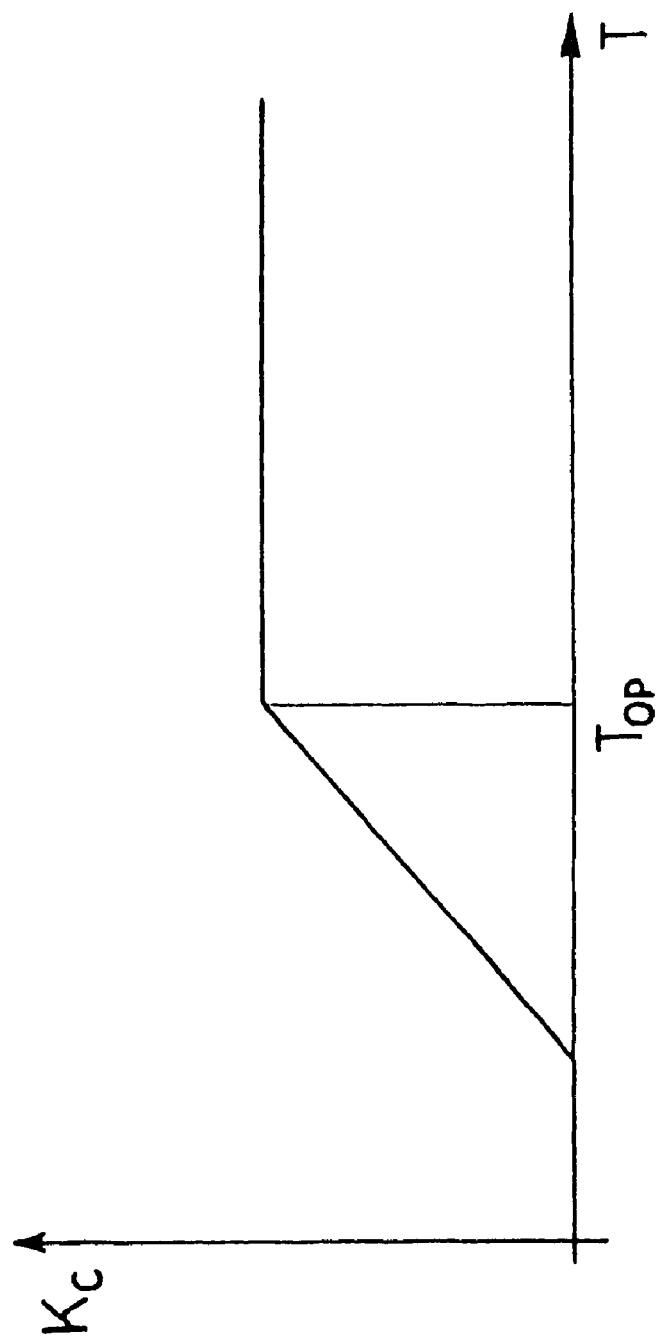
FIG. 5 is a graph showing the temperature dependence of a parameter of the system of FIG. 2.

In turn, the nominal power $P_{NOM}$ may be obtained from the equation:

$$P_{NOM} = K_C M_A (1/\lambda_1 - 1) H_I \tag{2}$$

in which $M_A$ is the flow of air supplied to the engine 2, equal to the flow of the exhaust gases flowing into the pre-catalyst 3, $\lambda_I$ is the input titre of the pre-catalyst 3 supplied by the first oxygen sensor 6 by means of the first composition signal $V_1$, $H_I$ is a mean calorific power of the exhaust gases, given by the mean, weighted according to the respective flows, of the calorific power of the non-combusted hydrocarbons and the calorific power of carbon monoxide and $K_C$ is a correction coefficient that takes account of the dependence of the oxidation reactions on the temperature of the pre-catalyst 3. The flow of air $M_A$ is known on the basis of the operating point of the engine 2, while the coefficient $K_C$ may be determined experimentally and has the curve shown in FIG. 5.

Equation (2) is valid when the input titre $\lambda_I$ is lower than 1, while in the opposite case the nominal power $P_{NOM}$ is zero.

When the pre-catalyst 3 is not operating in nominal conditions and with a nominal performance, however, it supplies the exhaust gases, in the time interval $\Delta\tau$, with a real heat $Q_R$ lower than the nominal heat $Q_{NOM}$.

The real heat $Q_R$ may be determined from a real power $P_R$ according to the equation:

$$Q_R = \int_{\tau_I}^{\tau_C} P_R \, d\tau \tag{3}$$

The real power $P_R$ is obtained from the power balancing equation applied to the pre-catalyst 3:

$$C_C dT_C/d\tau = M_A C_P(T_I - T_o) + P_R - h_{CA} S(T_C - T_A) \tag{4}$$

in which $T_C$ is the temperature of the pre-catalyst 3, $T_A$ is the temperature of the air externally to the pre-catalyst 3 (which may be measured in a known manner which is not described), $C_C$ and $S$ are the thermal capacity and respectively the surface area of the pre-catalyst 3, $h_{CA}$ is the coefficient of convective heat exchange between the pre-catalyst 3 and air and $C_P$ is the specific heat at constant pressure for the exhaust gases. All the terms appearing in equation (4), with the exception of the temperature $T_C$ of the pre-catalyst 3, are known because they can be measured or determined experimentally.

Moreover, the following expression is deduced from (4):

$$P_R = M_A C_P(T_o - T_I) + h_{CA} S(T_C - T_A) + C_C dT_C/d\tau \tag{5}$$

In order to determine the temperature $T_C$ of the pre-catalyst 3 use may be made of the power balancing applied to the exhaust gases within the pre-catalyst 3, as shown by the following equation:

$$M_A C_P(T_o - T_I) = h_{GC} S(T_G - T_C) \tag{6}$$

in which $h_{GC}$ is the coefficient of convective heat exchange between the exhaust gases and the pre-catalyst 3, which may be experimentally determined, and $T_G$ is the mean temperature of the exhaust gases within the pre-catalyst 3, estimated on the basis of the expression:

$$T_G = \frac{T_I + T_0}{2} \tag{7}$$

The value of the temperature $T_C$ of the pre-catalyst 3 can be obtained from (7):

$$T_C = \frac{T_I + T_0}{2} - \frac{M_A C_P}{h_{GC} S}(T_I - T_0) \tag{8}$$

which, inserted into (5), makes it possible to determine the real power $P_R$ and, via (3), the real heat $Q_R$ as a function of the input temperature $T_I$ and the output temperature $T_O$.

Figure 6:
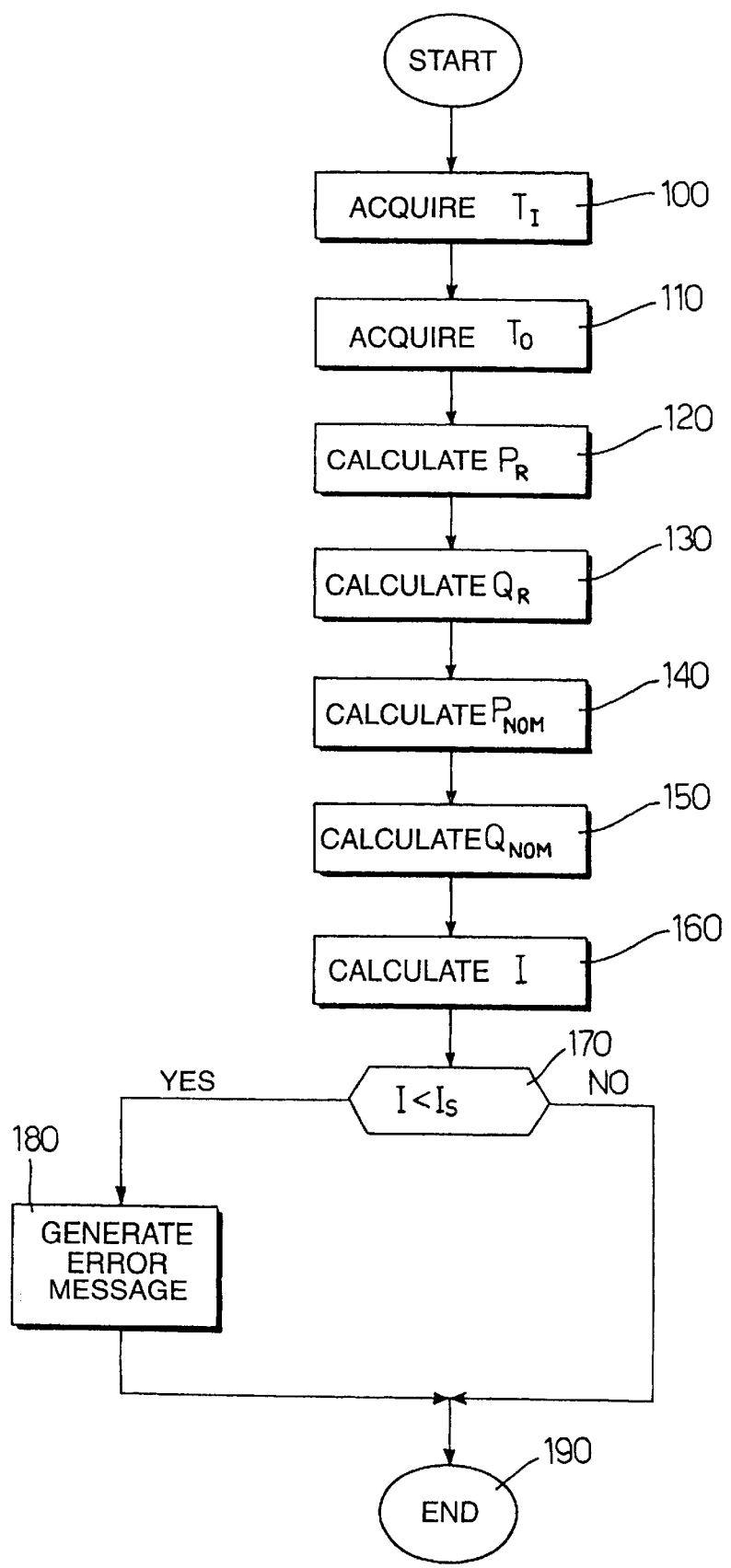
FIG. 6 is a flow diagram relating to the method of the present invention.

On the basis of the above description and with reference to FIG. 6, the diagnostic method of the present invention starts with the acquisition of current values of the input temperature $T_I$ (block 100) and the output temperature $T_O$ (block 110). The current values acquired correspond to the measurements recorded by the input temperature sensor 12 and the output temperature sensor 8 and represented by the input temperature signal $V_I$ and the output temperature signal $V_O$ respectively.

The real power $P_R$ is then calculated, in accordance with the equation (5) (block 120), so that the real heat $Q_R$ can then be obtained from equation (3) (block 130).

The nominal power $P_N$ is then calculated on the basis of equation (2) (block 140) and the nominal heat $Q_{NOM}$ is then calculated according to (1) (block 150).

An ageing index I, given by the ratio between the real heat $Q_R$ and the nominal heat $Q_{NOM}$ and therefore representative of the state of ageing of the pre-catalyst 3, is then calculated (block 160).

A test is then carried out to ascertain whether the ageing index I is lower than a predetermined threshold value $I_S$ (block 170). If so (output YES front the block 170) an error message is generated, setting the error signal E to a first logical value indicative of a malfunction (block 180) and the diagnostic algorithm is concluded (block 190). If not (output NO from the block 170) the diagnostic algorithm is terminated immediately after the performance of the test (block 190).

Figure 7:
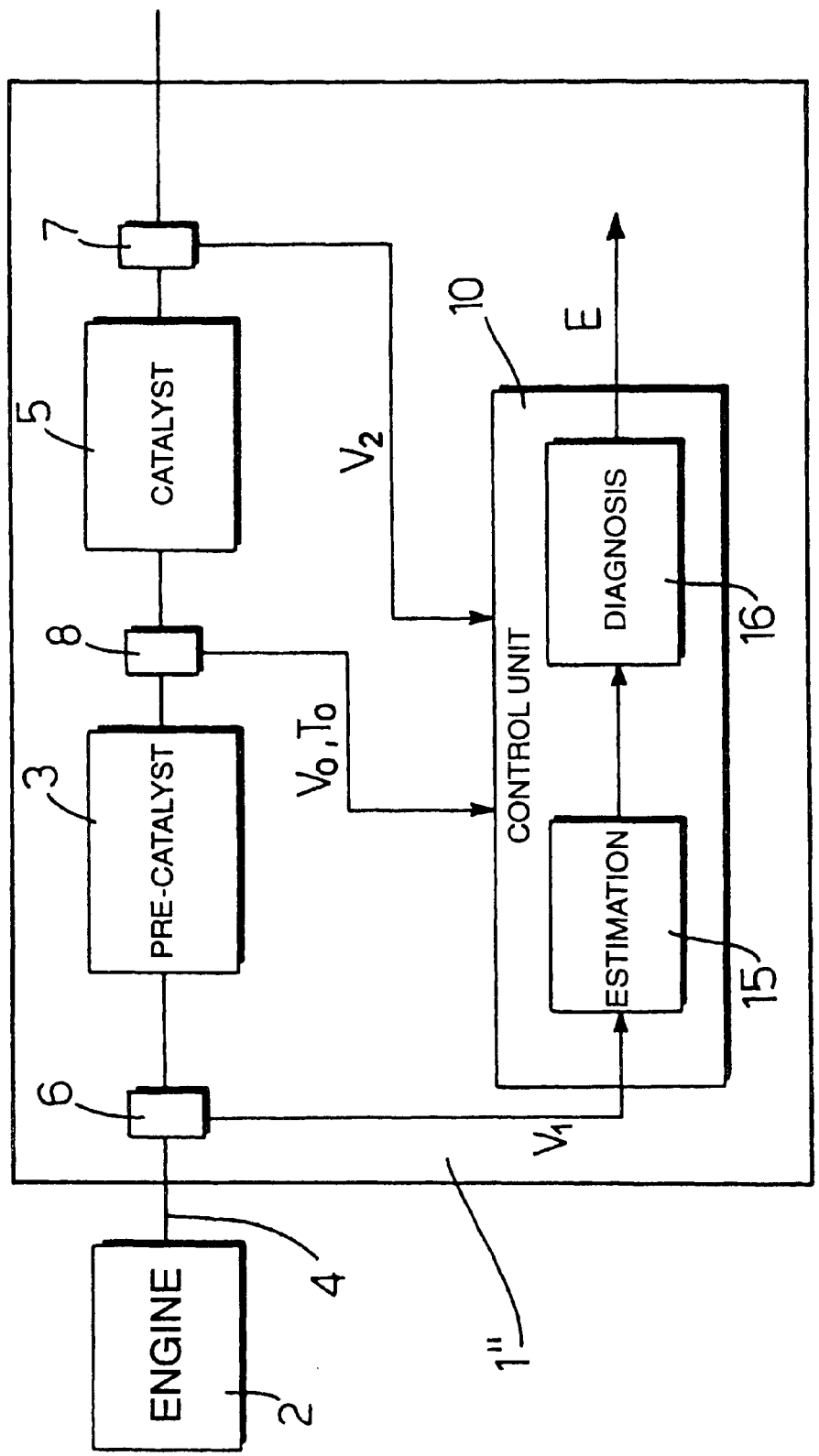
FIG. 7 is a simplified block diagram of an exhaust gas control system implementing a variant of the method of the present invention.

A variant of the method described above is based on an exhaust gas purification system 1″, shown in FIG. 7, in which members identical to those already described with reference to FIGS. 1 and 2 bear the same reference numerals.

The system 1″ differs from the preceding systems since the first composition signal $V_1$ supplied by the first oxygen sensor 6 is supplied to an estimation block 15 forming part of the control unit 10.

The estimation block 15 carries out an estimate of the input temperature $T_I$ as a function of the first composition signal $V_1$ and supplies it to a diagnostic block 16 which uses it to perform a diagnostic algorithm according to the variant of the present method.

For reference, the content of Patent Application No. BO99A000535, filed on Oct. 6, 1999 in the name of the applicants, in which an algorithm estimating the input temperature $T_I$ is described, is reviewed below.

The above-mentioned estimation algorithm comprises obtaining the temperature of the exhaust gases at the input of the pre-catalyst via the measurement of the electrical power that it is necessary to supply to the heater present in the oxygen sensor to maintain the latter at a predetermined operating temperature.

In particular, an estimation of this operating temperature is obtained from the measurement of the inner resistance of the sensor, the relationship between temperature and resistance being known, and is then compared with an objective temperature, obtaining a temperature error. The temperature error is supplied as input to a control unit, for instance a control unit with proportional-integral action, which supplies as output a control voltage in order to regulate the electrical power supplied to the heater.

Moreover, the estimated operating temperature and the control voltage, whose effective value is an index of the electrical power supplied to the heater, are supplied as input to an estimation block which, on the basis of a mathematical model of heat exchange between the sensor, the heater and the exhaust gases in which the sensor is immersed, obtains an estimate of the temperature of the exhaust gases.

According to the variant of the present method, the acquisition of a current value of the input temperature $T_I$ (block 100) corresponds in particular to the performance of an estimation by the estimation block 15 and to the recording of the value supplied in this way.

As will be appreciated, the variant described above does not require the use of the input temperature sensor 12.

The method described above has the following advantages.

In the first place, it is possible to carry out a reliable diagnosis of the pre-catalyst 3 separately from the main catalyst 5.

Moreover, the fact that the diagnosis is not affected by the variations of the heating transient of the pre-catalyst 3 as a result of ageing is also advantageous. These effect of these variations may solely be to decrease of the real heat $Q_R$ supplied to the exhaust gases and therefore the comparison with the nominal heat $Q_{NOM}$ represents a robust criterion for evaluating whether the pre-catalyst 3 is operating correctly.

A further advantage lies in the fact that the proposed solution is economic, since it requires the use of only one additional temperature sensor or even, in the case of the variant, the method may be implemented without having to include the use of new components.

It is evident that modifications and variations may be made to the method as described above without thereby departing from the scope of protection of the present invention.

In particular, it is also possible to use an estimation for the output temperature $T_O$, in place of the measurement supplied by the output temperature sensor 8, or to use estimates of the input temperature $T_I$ obtained in a manner other than that described.

What is claimed is:

1. A method for the diagnosis of an exhaust gas purification system in an internal combustion engine, comprising a pre-catalyst (3) and a main catalyst (5) disposed along an exhaust duct (4) of an internal combustion engine (2), first temperature detection means (12) disposed at the input of the pre-catalyst (3) and generating a first temperature signal ($V_I$) representative of an input temperature ($T_I$) of the exhaust gases at the input of the pre-catalyst (3), second temperature detection means (8) disposed at the output of the pre-catalyst (3) and generating a second temperature signal ($V_O$) representative of an output temperature ($T_O$) of the exhaust gases at the output of the pre-catalyst (3), oxygen sensor means, disposed at the input of the pre-catalyst (3) and generating an exhaust gas composition signal ($V_1$), representative of an input oxygen titre ($\lambda_I$), a control unit (10) receiving as input the first and second temperature signals and the exhaust gas composition signal ($V_1$) and supplying as output an error signal (E), the method comprising the stages of:

a) determining a real heat ($Q_R$) supplied to the exhaust gases in the pre-catalyst (3) as a function of the input temperature ($T_I$) and output temperature ($T_O$) (130);

b) determining a nominal heat ($Q_{NOM}$) corresponding to nominal operating conditions of the pre-catalyst (3) (150); and c) determining an index (I), representative of a state of wear of the pre-catalyst (3), on the basis of a ratio between the real heat ($Q_R$) and the nominal heat ($Q_{NOM}$) (160).

2. A method as claimed in claim 1, characterised in that the stage a) comprises the stages of:

a1) acquiring respective current values of the input temperature ($T_I$) and the output temperature ($T_o$) (100, 110);

a2) determining a real power ($P_R$) as a function of these current values;

a3) calculating the real heat ($Q_R$) according to the equation:

$$Q_R = \int_{\tau_I}^{\tau_C} P_R \, d\tau$$

($\tau_I$) being an initial instant and ($\tau_C$) being a current instant.

3. A method as claimed in claim 2, characterised in that the stage a2) of determining a real power ($P_R$) comprises the stage of:

a21) calculating the real power ($P_R$) according to the equation:

$$P_R = M_A C_P (T_o - T_I) + h_{CA} S (T_C - T_A) + C_C dT_C / d\tau$$

($M_A$) being a flow of air supplied to the engine (2), ($C_P$) being a specific heat at constant pressure for the exhaust gases, ($h_{CA}$) being a coefficient of convective heat exchange between the pre-catalyst (3) and air, ($C_C$) and (S) being a thermal capacity and respectively a surface area of the pre-catalyst (3), ($T_C$) being the temperature of the pre-catalyst (3) and ($T_A$) being the temperature of the air external to the pre-catalyst (3).

4. The method as claimed in claim 2, wherein the stage a1) of acquiring current values comprises the stage of:

a11) measuring the input temperature ($T_I$).

5. The method as claimed in claim 2, wherein the stage a1) of acquiring current values comprises the stage of:

a12) estimating the input temperature ($T_I$).

6. A method as claimed in claim 1, characterised in that the stage b) of determining a nominal heat ($Q_{NOM}$) comprises the stages of:

b1) determining a nominal power ($P_{NOM}$) (140);

b2) calculating the nominal heat ($Q_{NOM}$) according to the equation:

$$Q_{NOM} = \int_{\tau_I}^{\tau_C} P_{NOM} \, d\tau.$$

7. A method as claimed in claim 6, characterised in that the stage b1) of determining the nominal power ($P_{NOM}$) comprises the stage of:

b11) calculating the nominal power ($P_{NOM}$) according to the equation:

$$P_{NOM} = K_C M_A (1/\lambda_1 - 1) H_I$$

($K_C$) being a correction coefficient and ($H_I$) being a mean calorific power of the exhaust gases.

8. The method as claimed in claim 1, further comprising the stages of:

d) comparing the index (I) with a set of acceptability values; and e) generating the error signal (E) if the index (I) does not belong to the set of acceptability values.

9. The method as claimed in claim 8, wherein the stage d) of comparing the index (I) comprises the stage of:

d1) ascertaining whether the index is lower than a threshold value ($I_S$).

10. The method as claimed in claim 1, further comprising the stage of:

d) ascertaining whether the index (I) is lower than a threshold value ($I_S$).

11. A method for the diagnosis of an exhaust gas purification system in an internal combustion engine, said system including a pre-catalyst and a main catalyst disposed along an exhaust duct of an internal combustion engine, first temperature detection means disposed at the input of the pre-catalyst and generating a first temperature signal ($V_I$) representative of an input temperature ($T_I$) of the exhaust gases at the input of the pre-catalyst, second temperature detection means disposed at the output of the pre-catalyst and generating a second temperature signal ($V_O$) representative of an output temperature ($T_O$) of the exhaust gases at the output of the pre-catalyst, oxygen sensor means, disposed at the input of the pre-catalyst and generating an exhaust gas composition signal ($V_1$), representative of an input oxygen titre ($\lambda_I$), a control unit receiving as input the first and second temperature signals and the exhaust gas composition signal ($V_1$) and supplying as output an error signal (E), the method comprising the stages of:

a) determining a real heat ($Q_R$) supplied to the exhaust gases in the pre-catalyst as a function of the input temperature ($T_I$) and the output temperature ($T_O$);

b) determining a nominal heat ($Q_{NOM}$) corresponding to nominal operating conditions of the pre-catalyst;

c) determining an index (I), representative of a state of wear of the pre-catalyst, as a function of the real heat ($Q_R$) and the nominal heat ($Q_{NOM}$);

d) ascertaining whether the index (I) is lower than a threshold value ($I_S$).

12. The method as claimed in claim 11, wherein the stage c) of determining the index includes calculating the index using a ratio between the real heat ($Q_R$) and the nominal heat ($Q_{NOM}$).

13. The method as claimed in claim 11, wherein the stage d) includes comparing the index (I) with a set of acceptability values.

14. The method as claimed in claim 13, further comprising the stage of:

e) generating the error signal if the index does not belong to the set of acceptability values.

* * * * *